United States Patent
Watarai

(10) Patent No.: US 9,546,708 B2
(45) Date of Patent: Jan. 17, 2017

(54) TORSIONAL VIBRATION DAMPER

(75) Inventor: Shinichiro Watarai, Handa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 157 days.

(21) Appl. No.: 14/379,065

(22) PCT Filed: Mar. 22, 2012

(86) PCT No.: PCT/JP2012/057295
§ 371 (c)(1),
(2), (4) Date: Aug. 15, 2014

(87) PCT Pub. No.: WO2013/140562
PCT Pub. Date: Sep. 26, 2013

(65) Prior Publication Data
US 2015/0007687 A1   Jan. 8, 2015

(51) Int. Cl.
*F16F 15/121* (2006.01)
*F16F 15/30* (2006.01)
(Continued)

(52) U.S. Cl.
CPC .......... *F16F 15/1213* (2013.01); *F16D 13/64* (2013.01); *F16F 15/1205* (2013.01); *F16F 15/30* (2013.01);
(Continued)

(58) Field of Classification Search
CPC . F16D 13/64; F16D 15/1205; F16F 15/12326; F16F 15/1205
(Continued)

(56) References Cited

U.S. PATENT DOCUMENTS 2,590,579 A   3/1952   Sarazin
4,467,905 A   8/1984   Takeuchi
(Continued)

FOREIGN PATENT DOCUMENTS

EP   2318731 A1   5/2011
JP   S28-003210 B1   7/1953
(Continued)

OTHER PUBLICATIONS

English abstract of JP 2013-174294 A, Yoshida et al., Sep. 5, 2013.*
(Continued)

*Primary Examiner* — Vinh Luong
(74) *Attorney, Agent, or Firm* — Oliff PLC

(57) ABSTRACT

A torsional vibration damper is provided that is capable of increasing torsional rigidity without increasing a size of an elastic member in a radial direction. A torsional vibration damper includes a boss member and a disk plate provided coaxially with each other; an elastic member being elastically deformable in a rotation direction of the boss member; a cam member rotating integrally with the boss member; a torque transmission member transmitting rotation torque between the boss member and the disk plate; and a socket member provided between the torque transmission member and the elastic member and having a contact surface coming in contact with the torque transmission member. The torque transmission member is capable of entirely reciprocating in a radial direction of the boss member in accordance with rotation of the cam member, and elastically compresses the elastic member when it moves outward in the radial direction of the boss member.

6 Claims, 9 Drawing Sheets

(51) Int. Cl.
*F16D 13/64* (2006.01)
*F16F 15/12* (2006.01)
*F16D 3/12* (2006.01)

(52) U.S. Cl.
CPC .......... *F16D 3/12* (2013.01); *F16F 2230/0064* (2013.01); *Y10T 74/2131* (2015.01)

(58) Field of Classification Search
USPC ...................................................... 464/68.92
See application file for complete search history.

(56) References Cited

U.S. PATENT DOCUMENTS

| | | | |
|---|---|---|---|
| 4,585,427 A | | 4/1986 | Lamarche |
| 5,374,218 A | * | 12/1994 | Reik ....................... F16D 47/02 |
| | | | 192/213.21 |
| 5,697,261 A | * | 12/1997 | Mokdad .............. F16F 15/1204 |
| | | | 192/201 |
| 6,010,408 A | * | 1/2000 | Mueller .............. F16F 15/1331 |
| | | | 464/51 |
| 2010/0210365 A1 | * | 8/2010 | Schober ................ F16F 15/134 |
| | | | 464/68.1 |
| 2012/0238368 A1 | | 9/2012 | Watarai |
| 2013/0231195 A1 | * | 9/2013 | Takenaka ............ F16F 15/1205 |
| | | | 464/66.1 |
| 2015/0053527 A1 | * | 2/2015 | Oda ...................... F16F 15/134 |
| | | | 192/30 V |
| 2015/0133225 A1 | * | 5/2015 | Watarai ............... F16F 15/1205 |
| | | | 464/68.6 |

FOREIGN PATENT DOCUMENTS

| | | |
|---|---|---|
| JP | S57-173620 A | 10/1982 |
| JP | S59-37455 U | 3/1984 |
| JP | S61-223349 A | 10/1986 |
| JP | S63-75630 U | 5/1988 |
| JP | H09-280317 A | 10/1997 |
| JP | 2013-174294 A * | 9/2013 |
| WO | WO 2011/067815 A1 | 6/2011 |

OTHER PUBLICATIONS

Definition of Hold by Merriam-Webster, merriam-webster.com, May 16, 2016.*

* cited by examiner

TORSIONAL VIBRATION DAMPER

TECHNICAL FIELD

The present invention relates to a torsional vibration damper, and particularly to a torsional vibration damper including a first rotation member and a second rotation member that are coupled in a relatively rotatable manner via a torque transmission member and an elastic member such that rotation torque is transmitted between the first rotation member and the second rotation member.

BACKGROUND ART

Conventionally, driving sources such as an internal combustion engine and an electric motor, and wheels and the like are coupled via a drive transmission system having a reduction gear and the like, so that motive power is transmitted from the driving source through the drive transmission system to the wheels. However, in the drive transmission system coupled to the driving source, for example, "jara" sounds and muffled sounds are produced by torsional vibration resulting from rotation fluctuations caused by torque fluctuations in the internal combustion engine.

"Jara" sounds are abnormal sounds called "jarajara" caused by collision of an idling gear pair of a transmission gear set by the torsional vibration resulting from rotation fluctuations caused by torque fluctuations in the internal combustion engine. Furthermore, muffled sounds are abnormal sounds generated within a vehicle cabin by vibration caused by torsional resonance of the drive transmission system that results from torque fluctuations in the internal combustion engine. Torsional resonance of the drive transmission system exists in a normal region, for example.

A torsional vibration damper is conventionally known, by which a driving source such as an internal combustion engine and an electric motor, and wheels and the like are coupled to transmit rotation torque from the driving source while absorbing torsional vibration between the driving source and a drive transmission system having a transmission gear set (for example, see WO 2011/067815 (PTD 1)).

This torsional vibration damper includes a cam portion having a cam surface at its outer periphery and configured such that the curvature of the cam surface changes in the circumferential direction; a disk plate provided coaxially with the cam portion and rotatable relatively to the cam portion; and an elastic member provided between the cam portion and the disk plate and elastically deformed during relative rotation of the cam portion and the disk plate.

Furthermore, this torsional vibration damper includes an arm member having one end coming in contact with the cam surface of the cam portion and the other end biased by the elastic member. When the cam portion and the disc plate relatively rotate, this arm member rotates about the rotation shaft provided on the disk plate to elastically deform the elastic member, thereby transmitting rotation torque between the cam portion and the disk plate.

According to this torsional vibration damper, the arm member is swung in accordance with rotation of the cam portion to elastically deform the elastic member, so that the range of the torsion angle of the cam portion and the disk plate can be widened. Accordingly, the torsional rigidity of the cam portion and the disk plate can be entirely decreased, thereby sufficiently attenuating "jara" sounds and muffled sounds to allow improvement in vibration damping performance.

CITATION LIST

Patent Document

PTD 1: WO 2011/067815

SUMMARY OF INVENTION

Technical Problem

According to the torsional vibration damper disclosed in WO 2011/067815 (PTD 1), an arm member rotatable about the rotation shaft provided on the disk plate is used as a torque transmission member transmitting rotation torque between the cam portion and the disk plate. Since the arm member needs to be housed within the torsional vibration damper, the length of the elastic member extending in the circumferential direction of the disk plate is limited, and the elastically deforming amount of the elastic member in the circumferential direction is limited. Accordingly, large reaction force in the circumferential direction cannot be received from the elastic member, thereby making it difficult for the torsional vibration damper to increase torsional rigidity, which requires a further improvement.

Furthermore, in order to increase the rigidity of the elastic member to increase the torsional rigidity of the torsional vibration damper, it is conceivable to increase the size of the elastic member in the radial direction. In this case, however, since the elastic member that is relatively large in the radial direction is attached to the disk plate, the disk plate is increased in size in the radial direction. This causes a problem that the torsional vibration damper is increased in size.

The present invention has been made in light of the above-described problems. A main object of the present invention is to provide a torsional vibration damper capable of increasing torsional rigidity without increasing the size of the elastic member in the radial direction.

Solution to Problem

A torsional vibration damper according to the present invention includes a first rotation member, a second rotation member, an elastic member, a cam member, a torque transmission member, and a socket member. The first rotation member and the second rotation member are provided coaxially with each other. The elastic member is provided between the first rotation member and the second rotation member. The elastic member is elastically deformable in a rotation direction of the first rotation member. The cam member is provided coaxially with the first rotation member. The cam member rotates integrally with the first rotation member. The cam member has a cam surface that is changed in diameter in the rotation direction of the first rotation member. The torque transmission member comes in contact with the cam surface and transmits rotation torque between the first rotation member and the second rotation member. The socket member is provided between the torque transmission member and the elastic member. The socket member holds an end of the elastic member on a side of the torque transmission member. The socket member has a contact surface coming in contact with the torque transmission member. The torque transmission member is provided to be capable of entirely reciprocating in a radial direction of the first rotation member in accordance with rotation of the cam member. The torque transmission member elastically compresses the elastic member in the rotation direction when the torque transmission member moves outward in the radial direction of the first rotation member.

According to the above-described torsional vibration damper, preferably, the second rotation member is provided with a guide portion guiding the torque transmission member in the radial direction.

According to the above-described torsional vibration damper, preferably, the contact surface of the socket member is inclined with respect to the radial direction of the first rotation member.

The above-described torsional vibration damper preferably includes a holding member holding an end of the elastic member located on a side farther away from the torque transmission member. The socket member moves closer to the holding member in the rotation direction as the torque transmission member moves outward in the radial direction.

According to the above-described torsional vibration damper, preferably, the torque transmission member has an approximately cylindrical outer shape.

According to the above-described torsional vibration damper, preferably, the torque transmission member includes a shaft portion, a first rotating body provided so as to be rotatable with respect to the shaft portion and coming in contact with the cam surface, and a second rotating body provided so as to be rotatable with respect to the shaft portion and coming in contact with the contact surface. The first rotating body is smaller in outer diameter than the second rotating body.

According to the above-described torsional vibration damper, preferably, the torque transmission member includes a main body having a cylindrical outer peripheral surface, and a covering portion covering the outer peripheral surface. The covering portion is formed of a material that is smaller in coefficient of friction than a material of the main body.

Advantageous Effects of Invention

According to the torsional vibration damper of the present invention, torsional rigidity can be increased without increasing the size of the elastic member in the radial direction.

DESCRIPTION OF EMBODIMENTS

Figure 1:
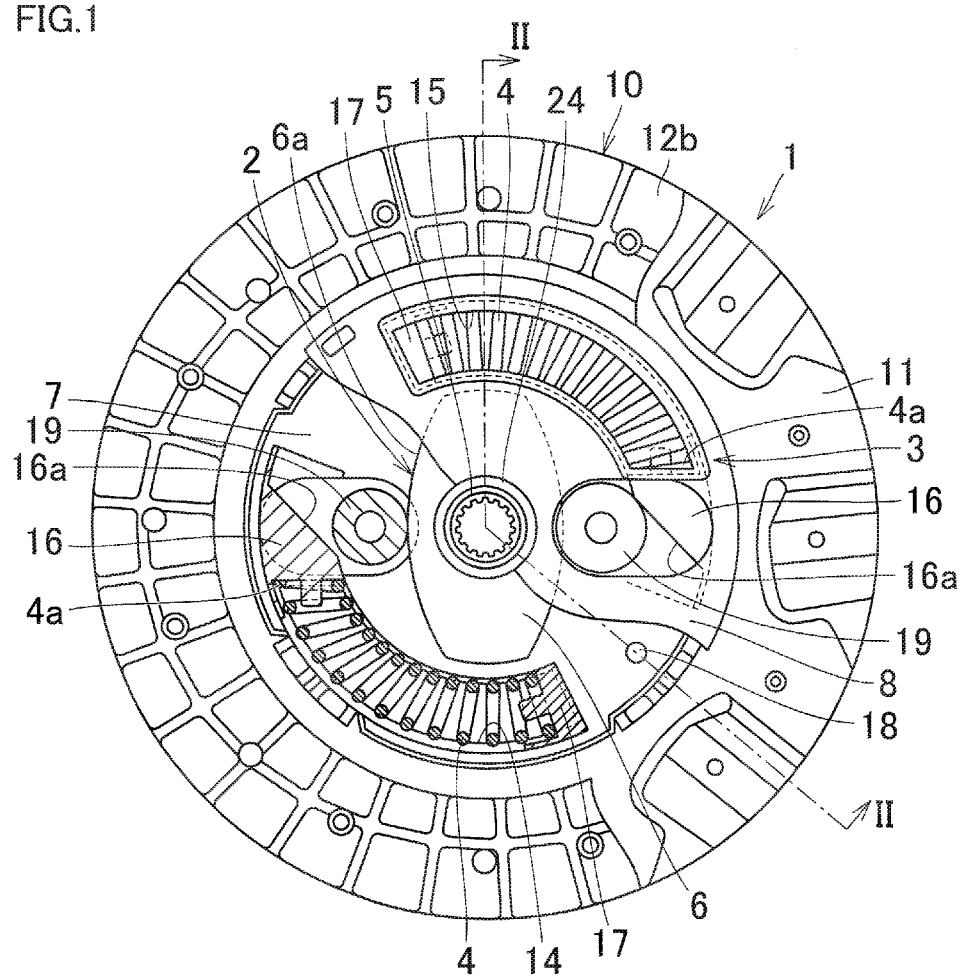
FIG. 1 is a front view of a torsional vibration damper according to the present embodiment.

The embodiments of the present invention will be hereinafter described with reference to the accompanying drawings, in which the same or corresponding components are designated by the same reference characters, and description thereof will not be repeated.

Figure 2:
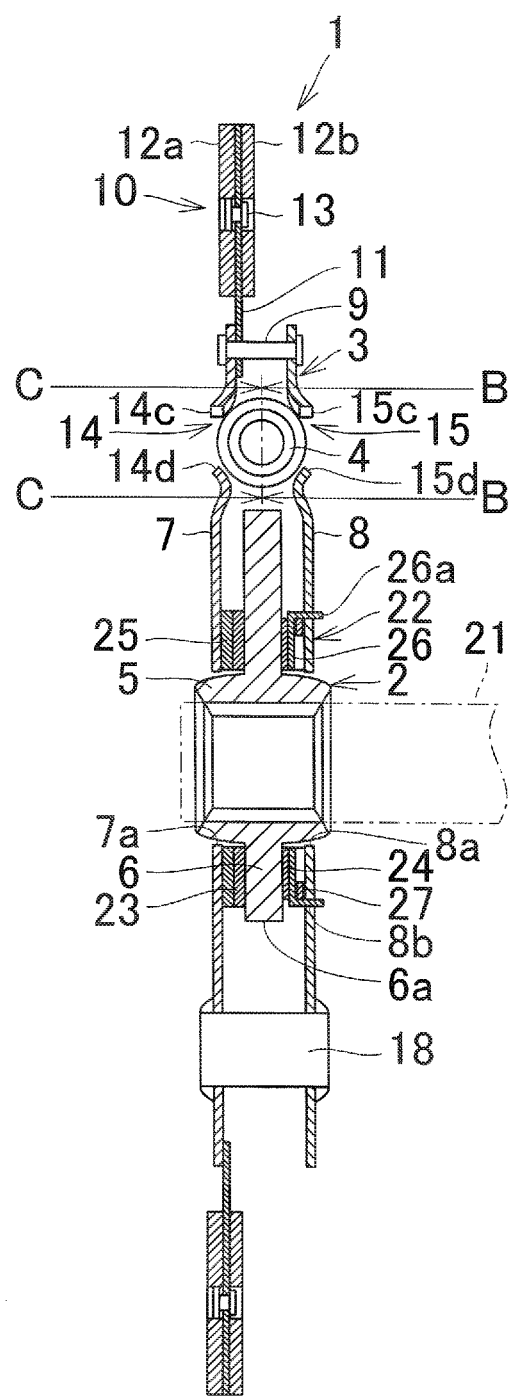
FIG. 2 is a cross-sectional view of the torsional vibration damper taken along a line II-II shown in FIG. 1.
Figure 3:
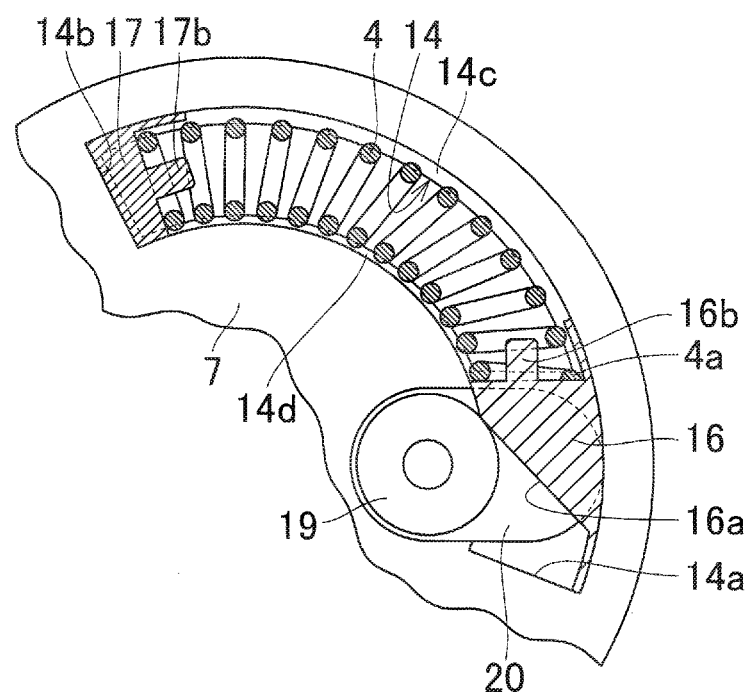
FIG. 3 is a cross-sectional view of the torsional vibration damper taken along an arrow in a direction B in FIG. 2.
Figure 4:
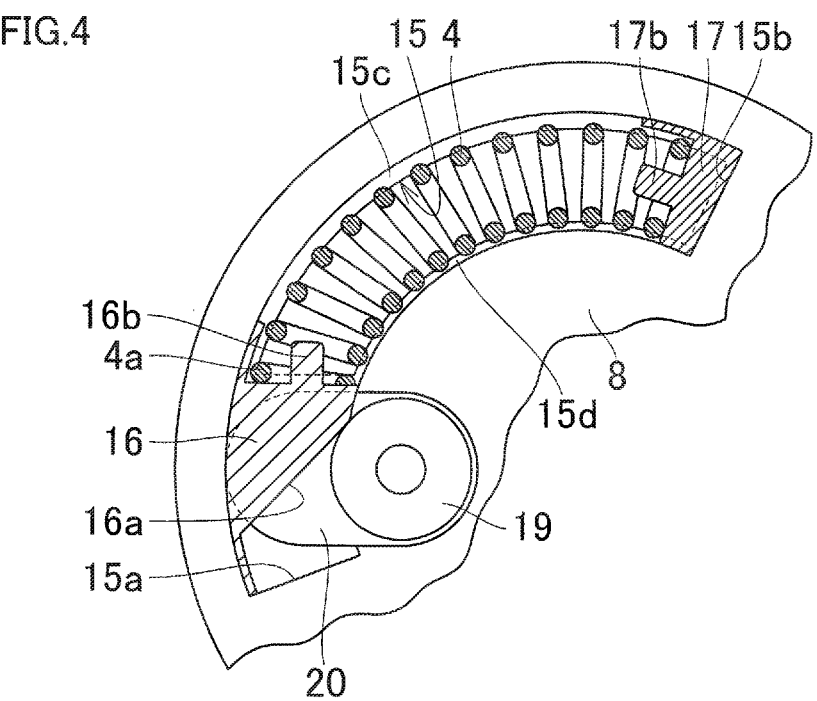
FIG. 4 is a cross-sectional view of the torsional vibration damper taken along an arrow in a direction C in FIG. 2.

FIG. 1 is a front view of a torsional vibration damper 1 according to the present embodiment. FIG. 2 is a cross-sectional view of torsional vibration damper 1 taken along a line II-II shown in FIG. 1. FIG. 3 is a cross-sectional view of torsional vibration damper 1 taken along an arrow in a direction B in FIG. 2. FIG. 4 is a cross-sectional view of torsional vibration damper 1 taken along an arrow in a direction C in FIG. 2. The configuration of torsional vibration damper 1 according to the present invention will be first described with reference to FIGS. 1 to 4.

As shown in FIGS. 1 and 2, torsional vibration damper 1 includes a driving-side rotation member 3, a driven-side rotation member 2, and a pair of coil springs 4 each as an elastic member. Driving-side rotation member 3 receives an input of rotation torque from an internal combustion engine (not shown) serving as a driving source. Driven-side rotation member 2 transmits the rotation torque input into driving-side rotation member 3 to a transmission of a drive transmission system that is not shown. Driving-side rotation member 3 and driven-side rotation member 2 are provided coaxially with each other. Coil springs 4 each are provided between driving-side rotation member 3 and driven-side rotation member 2. When driving-side rotation member 3 and driven-side rotation member 2 relatively rotate, each coil spring 4 elastically deforms so as to be compressed in the direction in which driving-side rotation member 3 and driven-side rotation member 2 rotate.

Driven-side rotation member 2 is configured to include a boss member 5 as the first rotation member and a cam member 6. Boss member 5 is spline-fitted to the outer periphery of an input shaft 21 of the transmission of the drive transmission system. Cam member 6 is provided at the outer periphery of boss member 5 coaxially with boss member 5, and rotates integrally with boss member 5. Boss member 5 and cam member 6 may be integrally formed. Alternatively, boss member 5 and cam member 6 may be separately formed, and spline portions are formed in the outer periphery of boss member 5 and in the inner periphery of cam member 6, respectively, so that boss member 5 and cam member 6 may be spline-fitted to each other.

Driving-side rotation member 3 is configured to include a pair of disk plates 7 and 8 each as the second rotation member, and a clutch disc 10. Disk plates 7 and 8 are provided coaxially with boss member 5, and disposed on both sides of boss member 5 in the axial direction. Disk plates 7 and 8 are located at a prescribed distance from each other in the axial direction, fixed to each other by a pin 9 and a connecting shaft 18, and integrally formed in a simple configuration. Disk plates 7 and 8 are provided at their center portions with circular center holes 7a and 8a, respectively (see FIG. 2). Boss member 5 is housed in these center holes 7a and 8a.

Pin 9 and connecting shaft 18 each are bridged between disk plates 7 and 8. Pin 9 and connecting shaft 18 each have both ends in the axial direction that are relatively larger in diameter, so that these pin 9 and connecting shaft 18 each are anchored to disk plates 7 and 8 so as not to come off from disk plates 7 and 8. Disk plates 7 and 8 are integrally formed by connecting shaft 18 and pin 9, so that they integrally rotate.

Clutch disc 10 is provided outward in the radial direction of disk plate 7, and includes a cushioning plate 11 and friction members 12a and 12b. Cushioning plate 11 is formed of a ring-shaped member corrugated in the thickness direction, and fixed to disk plates 7 and 8 by pin 9.

Friction members 12a and 12b are fixed to both surfaces of cushioning plate 11 by a rivet 13. These friction members 12a and 12b are located between a flywheel (not shown) fixed to the crankshaft of the internal combustion engine and a pressure plate of the clutch cover fixed by a bolt to the flywheel.

Friction members 12a and 12b are pressed against the pressure plate, thereby frictionally engaging with the flywheel and the pressure plate, so that the rotation torque of the internal combustion engine is input into disk plates 7 and 8.

When a clutch pedal (not shown) is depressed, pressing of the pressure plate against friction members 12a and 12b is released, and friction members 12a and 12b are separated from the flywheel. In this case, the rotation torque of the internal combustion engine is not input into disk plates 7 and 8.

Disk plates 7 and 8 are provided with a pair of receiving holes 14 and 15, respectively. Receiving holes 14 and 15 are spaced apart from each other in the circumferential direction of disk plates 7 and 8, respectively. This pair of receiving holes 14 and 15 is provided opposite to each other in the axial direction of disk plates 7 and 8, and each receive coil spring 4. Coil spring 4 is provided such that it can elastically deform in the circumferential direction of each of disk plates 7 and 8. In addition, the circumferential directions of disk plates 7, 8 and boss member 5 correspond to the rotation directions of disk plates 7, 8 and boss member 5 provided coaxially with each other, which are the same direction as a matter of course.

These receiving holes 14 and 15 are curved in the circumferential directions of disk plates 7 and 8, respectively. In the normal state, that is, in the state before being attached to receiving holes 14 and 15, each coil spring 4 has a shape curved in the same direction as the circumferential directions of disk plates 7 and 8. Accordingly, coil spring 4 is curved in the state where coil spring 4 is housed in each of receiving holes 14 and 15. On the outer peripheral side of coil spring 4, receiving holes 14 and 15 are opened by punching press. Also, at both ends of each of disk plates 7 and 8 in the circumferential direction, receiving holes 14 and 15 form closed ends.

As shown in FIGS. 2 to 4, disk plate 7 includes an outer support piece 14c and an inner support piece 14d while disk plate 8 includes an outer support piece 15c and an inner support piece 15d. Outer support pieces 14c and 15c extend in the circumferential direction along the radially outward edges of receiving holes 14 and 15, respectively, while inner support pieces 14d and 15d extend in the circumferential direction along the radially inward edges of receiving holes 14 and 15, respectively. As shown in FIG. 2, outer and inner support pieces 14c and 14d, and outer and inner support pieces 15c and 15d protrude outward in the axial direction of disk plates 7 and 8, respectively.

Coil spring 4 has one end 4a in the circumferential direction that is held by socket member 16. Coil spring 4 has the other end in the circumferential direction that is held by a spring seat 17. Receiving holes 14 and 15 each house socket member 16 and spring seat 17 therein. Both ends of coil spring 4 in the circumferential direction are supported by socket member 16 and spring seat 17, respectively, at both ends of each of receiving holes 14 and 15 in the circumferential direction.

Socket member 16 and spring seat 17 each have a surface facing coil spring 4 and provided with a protrusion 16b, 17b. These protrusions 16b, 17b each have a height corresponding to one winding or two windings of coil spring 4 at each end in the circumferential direction. Both ends of coil spring 4 in the circumferential direction are inserted through each protrusion 16b, 17b, and the starting end and the terminal end of coil spring 4 in the winding direction are engaged with each protrusion 16b, 17b. Consequently, coli spring 4 can be prevented from rotating and can be attached to socket member 16 and spring seat 17.

As shown in FIGS. 3 and 4, the closed ends at both ends of each of receiving holes 14 and 15 in the circumferential direction form abutting portions 14a and 15a, respectively, on which the end of socket member 16 in the circumferential direction abuts; and abutting portions 14b and 15b, respectively, on which the end of spring seat 17 in the circumferential direction abuts. In the state where coil spring 4 is extended, the end of each socket member 16 in the circumferential direction abuts on corresponding one of abutting portions 14a and 15a while the end of each spring seat 17 in the circumferential direction abuts on corresponding one of abutting portions 14b and 15b.

Each of socket member 16 and spring seat 17 engages with outer and inner support pieces 14c and 14d, and outer and inner support pieces 15c and 15d, thereby being prevented from coming off from receiving holes 14 and 15 by means of outer and inner support pieces 14c and 14d, and outer and inner support pieces 15c and 15d, respectively.

Socket member 16 and spring seat 17 each have an inner end and an outer end in the radial direction that are formed along the curved surfaces of the inner end and the outer end, respectively, of each of receiving holes 14 and 15 in the radial direction. Socket member 16 is formed such that it can move smoothly along each of receiving holes 14 and 15 in accordance with elastic deformation of coil spring 4.

A torque transmission member 19 having an approximately cylindrical outer shape is disposed between socket member 16 and cam member 6. Disk plates 7 and 8 are provided with fitting holes 20, respectively, extending in the radial directions of disk plates 7 and 8. Torque transmission member 19 is fitted into fitting hole 20. When torque transmission member 19 is received in fitting hole 20, torque transmission member 19 is supported by each of disk plates 7 and 8 in a simple configuration. Torque transmission member 19 engages with fitting hole 20 provided in each of disk plates 7 and 8, such that torque transmission member 19 can entirely reciprocate in the radial direction of each of disk plates 7 and 8 in which fitting hole 20 extends.

Fitting hole 20 functions as a guide portion guiding torque transmission member 19 in the radial direction of each of disk plates 7 and 8. In place of the configuration in which fitting hole 20 functions as a guide portion, for example, a groove may be provided in each of disk plates 7 and 8. Furthermore, for example, a protrusion formed in one of the surface of each of disk plates 7, 8 and the end of torque transmission member 19 may be engaged with a concave portion provided in the other of this surface and this end, for guiding torque transmission member 19 in the radial direction of each of disk plates 7 and 8.

As shown in FIGS. 1, 3 and 4, socket member 16 is provided with a contact surface with which the outer peripheral surface of torque transmission member 19 comes in contact. This contact surface is formed of a linear tapered surface 16a that is inclined with respect to the radial direction and the circumferential direction of each of disk plates 7 and 8. In other words, socket member 16 of the present embodiment is formed in a wedge shape having tapered surface 16a. A part of the outer peripheral surface of torque transmission member 19 abuts on tapered surface 16a of socket member 16. Another part of the outer peripheral surface of torque transmission member 19 abuts on cam surface 6a of cam member 6.

In the present embodiment, cam member 6 has cam surface 6a configured such that the cam diameter continuously changes in the circumferential direction. The diameter of this cam surface 6a is at the minimum in a portion at which cam surface 6a comes in contact with torque transmission member 19, at the initial position shown in FIG. 1 where the torsion angle between disk plates 7, 8 and cam member 6 is at the minimum (the torsion angle is approximately 0°), that is, at the neutral position where no torsion occurs between disk plates 7, 8 and cam member 6. In accordance with an increase in the torsion angle between disk plates 7, 8 and cam member 6, there occurs a change in the position on cam surface 6a with which torque transmission member 19 comes in contact. In accordance with this position change, the diameter of cam surface 6a is gradually increased.

Cam member 6 of the present embodiment is formed so as to be point-symmetric with respect to the center axis of disk plates 7 and 8, and is identical in curvature across the center axis of disk plates 7 and 8. The initial position of cam member 6 is set such that torque transmission member 19 abuts on cam surface 6a having a relatively small diameter when the torsion angle between disk plates 7, 8 and boss member 5 is at the minimum. When cam member 6 is located at the initial position, torque transmission member 19 is disposed on the innermost side of each of disk plates 7 and 8 in the radial direction, in which case the length of coil spring 4 extending in the circumferential direction of each of disk plates 7 and 8 is at the maximum.

Socket member 16 holds one end 4a corresponding to an end of coil spring 4 on the side closer to torque transmission member 19. Spring seat 17 as a holding member holds the other end corresponding to an end of coil spring 4 on the side farther away from torque transmission member 19. Socket member 16 is provided between torque transmission member 19 and coil spring 4.

When cam member 6 rotates from the initial position, there occurs a change in the position of cam surface 6a on which the outer peripheral surface of torque transmission member 19 abuts. When the diameter of cam surface 6a on which torque transmission member 19 abuts is increased, torque transmission member 19 moves outward in the radial direction. When torque transmission member 19 moves outward in the radial direction, socket member 16 is pressed by torque transmission member 19 to thereby increase the compressed amount of coil spring 4.

Socket member 16 smoothly moves along the peripheral edge of each of receiving holes 14 and 15 in the direction closer to spring seat 17, to cause elastic deformation such that coil spring 4 is compressed. On the other hand, when coil spring 4 is elastically deformed so as to be extended, socket member 16 smoothly moves in the direction farther away from spring seat 17.

As shown in FIG. 2, a hysteresis torque generation mechanism 22 is interposed between disk plates 7, 8 and cam member 6. This hysteresis torque generation mechanism 22 is configured to include annular friction members 23, 24, 25, and 26, and a disc spring 27.

Friction members 23 and 24 each have a surface formed of a member having a prescribed coefficient of friction, and fixed to the outer peripheral surface of cam member 6 in the axial direction by an adhesive. In addition, a pin and the like may be provided integrally in each of friction members 23 and 24, and fitted into a pin hole provided in the outer peripheral surface of cam member 6 in the axial direction, thereby attaching friction members 23 and 24 to cam member 6.

Furthermore, friction member 25 has a surface formed of a member having a prescribed coefficient of friction, and fixed to the inner peripheral surface of disk plate 7 by an adhesive. In addition, a pin and the like may be provided integrally in friction member 25 and fitted into a pin hole provided in the inner peripheral surface of disc plate 7, thereby attaching friction member 25 to disc plate 7.

Friction member 26 has a surface formed of a member having a prescribed coefficient of friction, and has a radially outer peripheral surface that is provided integrally with a plurality of pins 26a. Each of these pins 26a is configured to be fitted into a pin hole 8b provided in the inner peripheral surface of disk plate 8. Friction member 26 is attached to the inner peripheral surface of disk plate 8.

Disc spring 27 is formed in a conical shape and interposed between friction member 26 and disk plate 8. This disc spring 27 generates elastic force in the axial direction of cam member 6 to cause frictional contact between friction member 24 and friction member 26 and also cause frictional contact between friction member 23 and friction member 25, thereby causing frictional contact between cam member 6 and each of disk plates 7 and 8, so that hysteresis torque is generated between cam member 6 and disk plates 7, 8.

Figure 5:
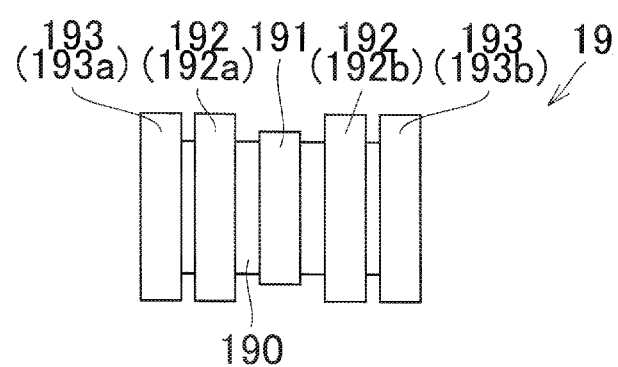
FIG. 5 is a side view showing the configuration of an example of a torque transmission device.

FIG. 5 is a side view showing the configuration of an example of torque transmission member 19. The example of torque transmission member 19 shown in FIG. 5 includes a solid cylindrical shaft portion 190, and bearings 191, 192 and 193 attached to shaft portion 190. Bearings 191, 192 and 193 are provided so as to have a common axis line serving as the center of rotation. Bearings 191, 192 and 193 each include an inner ring, an outer ring and a rolling element. The inner ring of each of bearings 191, 192 and 193 is an annular member fixed to shaft portion 190. The outer ring of each of bearings 191, 192 and 193 is an annular member having the center common to shaft portion 190, and provided so as to be rotatable with respect to shaft portion 190. The rolling element of each of bearings 191, 192 and 193 is supported in a rotatable manner between the inner ring and the outer ring.

Bearing 193 (193a), bearing 192 (192a), bearing 191, bearing 192 (192b), and bearing 193 (193b) are arranged sequentially from one end to the other end of shaft portion 190 in the direction in which shaft portion 190 extends. Bearings 193a, 192a, 191, 192b, and 193b are arranged sequentially at a distance from one another in the direction in which shaft portion 190 extends.

The outer ring of bearing 191 has a function as the first rotating body coming in contact with cam surface 6a of cam member 6 and rolling on cam surface 6a. The outer ring of bearing 192 (192a, 192b) has a function as the second rotating body coming in contact with tapered surface 16a of socket member 16 and rolling on tapered surface 16a. The outer ring of bearing 193 (193a, 193b) has a function as the third rotating body coming in contact with the inner peripheral surface of fitting hole 20 provided in each of disk plates 7 and 8, and rolling on the inner peripheral surface of fitting hole 20.

Bearing 191 is smaller in outer diameter than bearings 192 and 193. The outer ring of bearing 191 coming in contact with cam member 6 is formed so as to be smaller in diameter than other bearings 192 and 193. By defining the diameter of bearing 191 in this way, it becomes possible to avoid that bearing 191 coming in contact with cam member 6 comes in contact with tapered surface 16a of socket member 16 to prevent rotation of the outer ring of bearing 191. Since interference between bearing 191 and socket member 16 can be prevented, it becomes possible to improve the operation performance of torque transmission member 19 that reciprocates in the radial direction.

Figure 6:
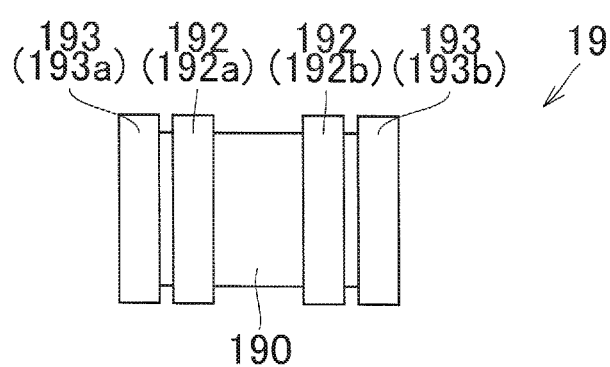
FIG. 6 is a side view showing the configuration of another example of the torque transmission device.

FIG. 6 is a side view showing the configuration of another example of torque transmission member 19. Unlike the example of torque transmission member shown in FIG. 5, another example of torque transmission member 19 shown in FIG. 6 does not have a bearing between bearings 192a and 192b. Shaft portion 190 shown in FIG. 6 is identical in outer diameter to bearing 191 shown in FIG. 5, and smaller in outer diameter than bearings 192 and 193. Cam surface 6a of cam member 6 comes in contact with the cylindrical outer peripheral surface of shaft portion 190 between bearing 192a and bearing 192b, and slides on this outer peripheral surface.

Torque transmission member 19 having the configuration shown in FIG. 6 is configured such that shaft portion 190 is smaller in diameter than bearings 192 and 193, so that interference between shaft portion 190 and tapered surface 16a of socket member 16 can be avoided. Since one bearing is reduced as compared with the torque transmission member shown in FIG. 5, less expensive torque transmission member 19 can be provided.

Figure 7:
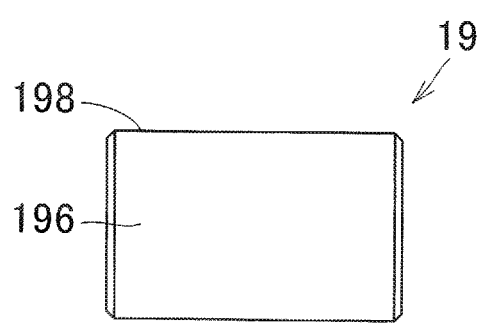
FIG. 7 is a side view showing the configuration of still another example of the torque transmission device.

FIG. 7 is a side view showing the configuration of still another example of torque transmission member 19. Unlike the torque transmission member shown in FIGS. 5 and 6, the example of torque transmission member 19 shown in FIG. 7 does not have a bearing. Torque transmission member 19 shown in FIG. 7 has a cylindrical main body 196. Main body 196 has a cylindrical outer peripheral surface. The outer peripheral surface of main body 196 is covered by a covering portion 198. Covering portion 198 is formed by providing a material forming covering portion 198 on the outer peripheral surface of main body 196 by means of any method such as coating. Covering portion 198 is formed of a material that is smaller in coefficient of friction than the material of main body 196. For example, the material forming covering portion 198 may be DLC (Diamond-like Carbon) having a relatively smaller coefficient of friction.

Torque transmission member 19 shown in FIG. 7 slides, at its outer peripheral surface having covering portion 198 formed thereon, on cam surface 6a of cam member 6, tapered surface 16a of socket member 16, and the inner peripheral surface of fitting hole 20. Since the entire outer peripheral surface of torque transmission member 19 is formed of a material having a relatively smaller coefficient of friction and facilitating sliding, torque transmission member 19 can be readily reciprocated in the radial direction without having to use a bearing. Since the entire outer peripheral surface of torque transmission member 19 can readily slide on another members, there occurs no problem of interference between the bearing coming in contact with cam member 6 and socket member 16 as described above.

When torque transmission member 19 is configured such that the outer peripheral surface of the bearing comes in contact with cam surface 6a of cam member 6 and tapered surface 16a of socket member 16, the contact stresses between the bearing and cam member 6 and between the bearing and socket member 16 are increased since the width of the bearing is relatively narrow and the contact area is relatively small. In contrast, when torque transmission member 19 is formed in a slide pin shape shown in FIG. 7, it becomes possible to increase the width in which torque transmission member 19 and cam surface 6a come in contact with each other, and the width in which torque transmission member 19 and tapered surface 16a come in contact with each other, thereby allowing an increase in contact area, with the result that the contact stress can be reduced.

Figure 8:
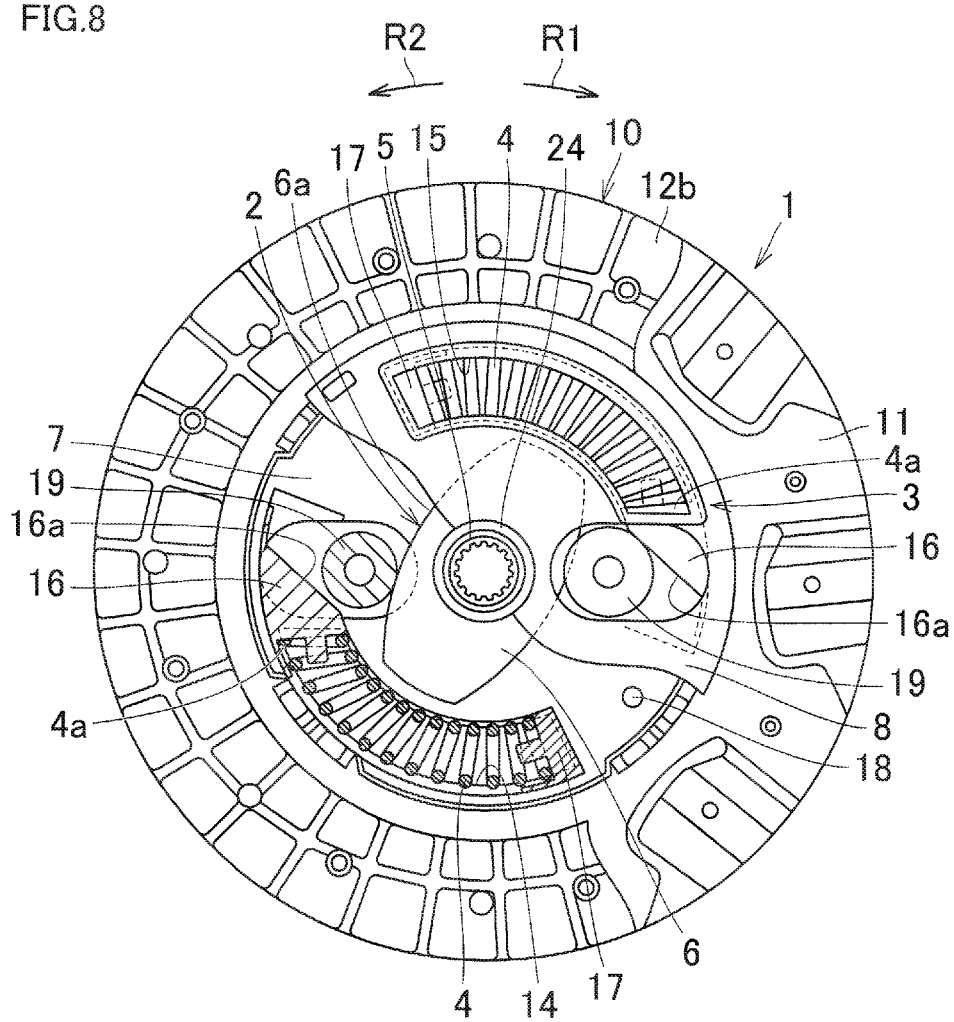
FIG. 8 is a front view of the torsional vibration damper in the case where a torsion angle of a cam member with respect to a disk plate is +30°.

The effect of torsional vibration damper 1 will then be described. FIG. 8 is a front view of the torsional vibration damper in the case where the torsion angle of cam member 6 with respect to disk plates 7 and 8 is +30°. In addition, FIG. 8 and FIGS. 9 and 10 described later each show the state where disk plates 7 and 8 rotate in the counterclockwise direction (in a direction R2) from the state shown in FIG. 1 under the rotation torque of the internal combustion engine. For convenience of explanation, a description will be made assuming that cam member 6 undergoes torsion in the clockwise direction (a direction R1) on the positive side with respect to disk plates 7 and 8. It is to be noted that cam member 6 undergoes torsion to the positive side with respect to disk plates 7 and 8, which occurs during acceleration of the vehicle.

Friction members 12a and 12b are pressed by a pressure plate to frictionally engage with the flywheel and the pressure plate, so that the rotation torque of the internal combustion engine is input into disk plates 7 and 8.

According to torsional vibration damper 1 of the present embodiment, in the state where relative rotation of disk plates 7, 8 and cam member 6 is relatively small, that is, in the state where the torsion angle between disk plates 7, 8 and cam member 6 is relatively small such as around 0°, cam member 6 is located at the initial position and rotates integrally with boss member 5, as shown in FIG. 1. In this case, the reaction force exerted from coil spring 4 causes torque transmission member 19 to press against cam member 6, so that the rotation torque is transmitted between disk plates 7, 8 and boss member 5 via coil spring 4 provided between disk plates 7, 8 and boss member 5. Since the compressed amount of coil spring 4 is relatively small in this case, the torsional rigidity of disk plates 7, 8 and boss member 5 becomes relatively small.

In the case where the rotation fluctuations caused by torque fluctuations in the internal combustion engine are relatively small during acceleration of the vehicle, the fluctuation torque between disk plates 7, 8 and boss member 5 is relatively small, so that boss member 5 rotates relative to disk plates 7 and 8 in the clockwise direction (direction R1).

Cam member 6 has elliptical cam surface 6a. The radius of rotation of cam surface 6a during rotation of cam member 6 changes in the circumferential direction. Torque transmission member 19 is provided between cam member 6 and coil spring 4. Torque transmission member 19 has an outer peripheral surface that comes in contact with cam surface 6a of cam member 6 and tapered surface 16a of socket member 16. As in the manner from the state shown in FIG. 1 to the state shown in FIG. 8, when cam member 6 rotates relative to disk plates 7 and 8 in the direction R1 in accordance with an increase in the torsion angle between disk plates 7, 8 and boss member 5, torque transmission member 19 is pressed by cam surface 6*a* of cam member 6, and moves in the radial direction.

At this time, cam member 6 exerts, on torque transmission member 19, the force in the direction in which torque transmission member 19 is pressed against socket member 16. Under the force from cam surface 6*a* of cam member 6, torque transmission member 19 is pressed toward tapered surface 16*a* of socket member 16. Socket member 16 converts the force of cam member 6 pressing torque transmission member 19 in the radial direction into the force in the circumferential direction in which coil spring 4 extends. Coil spring 4 is biased by cam member 6 via torque transmission member 19, and elastically compressed in the circumferential direction.

At this time, the force of torque transmission member 19 pressing cam member 6 is increased by the reaction force that is increased in accordance with an increase in the elastically deforming amount of coil spring 4. Accordingly, the rotation torque of each of disk plates 7 and 8 is transmitted to cam member 6 via coil spring 4 and torque transmission member 19, and boss member 5 rotates integrally with cam member 6, to thereby transmit the rotation torque of the internal combustion engine to the input shaft of the transmission.

Starting from the state where cam member 6 is located at the initial position, the diameter of cam surface 6*a* is increased in accordance with an increase in the torsion angle between disk plates 7, 8 and boss member 5. Accordingly, when disk plates 7, 8 and boss member 5 relatively rotate to increase the torsion angle between disk plates 7, 8 and boss member 5, torque transmission member 19 is pressed against cam surface 6*a* of cam member 6, and thereby moves radially outward in the radial direction of disc plates 7 and 8 in which fitting hole 20 extends.

Displacement of torque transmission member 19 in the radial direction is converted through tapered surface 16*a* of socket member 16 into displacement in the circumferential direction. Accordingly, when torque transmission member 19 moves outward in the radial direction of disk plates 7 and 8, socket member 16 moves in the circumferential direction. When socket member 16 moves toward spring seat 17 along the peripheral edge of each of receiving holes 14 and 15, coil spring 4 is compressed in the circumferential direction. Since one end of spring seat 17 in the circumferential direction abuts on each of abutting portions 14*b* and 15*b* of receiving holes 14 and 15, coil spring 4 is compressed when socket member 16 moves toward spring seat 17 along the peripheral edge of each of receiving holes 14 and 15.

As the torsion angle between disk plates 7, 8 and boss member 5 is increased and cam member 6 rotates in the clockwise direction, the amount of radially-outward movement of torque transmission member 19 is increased, thereby gradually increasing the biasing force of torque transmission member 19 biasing coil spring 4 through socket member 16.

When torque transmission member 19 biases coil spring 4 through socket member 16 in this way, coil spring 4 is elastically deformed and compressed in the circumferential direction. Elastically deformed coil spring 4 generates biasing force that acts to restore the deformed shape to its original shape. By the reaction force of compressed coil spring 4, the radially inward force is exerted from tapered surface 16*a* of socket member 16 upon torque transmission member 19, so that torque transmission member 19 presses cam member 6 with strong pressing force. Accordingly, the rotation torque of each of disk plates 7 and 8 is reliably transmitted to cam member 6 through coil spring 4 and torque transmission member 19. Therefore, the torsional vibrations between disk plates 7, 8 and boss member 5 can be absorbed and damped while transmitting the motive power of the internal combustion engine from disk plates 7 and 8 to boss member 5.

Figure 9:
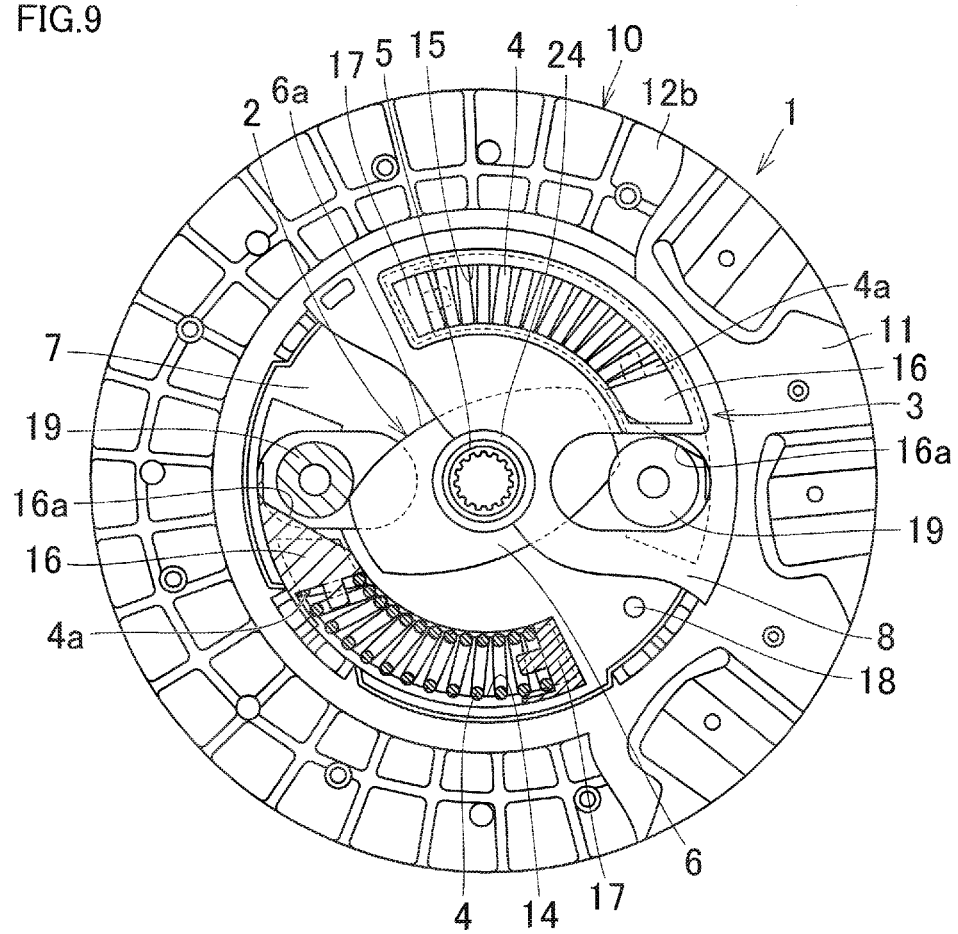
FIG. 9 is a front view of the torsional vibration damper in the case where the torsion angle of the cam member with respect to the disk plate is +70°.

FIG. 9 is a front view of the torsional vibration damper in the case where the torsion angle of cam member 6 with respect to disk plates 7 and 8 is +70°. When the torsion angle between each of disk plates 7 and 8 and cam member 6 is further increased starting from the state shown in FIG. 8, torque transmission member 19 moves along cam surface 6*a* as shown in FIG. 9. When torque transmission member 19 is pressed by cam surface 6*a* of cam member 6, torque transmission member 19 further moves outward in the radial direction of each of disk plates 7 and 8.

Displacement of torque transmission member 19 in the radial direction is converted through tapered surface 16*a* of socket member 16 into displacement in the circumferential direction. In this case, when socket member 16 further moves toward spring seat 17 along the peripheral edge of each of receiving holes 14 and 15, coil spring 4 is further compressed in the circumferential direction. Therefore, the torsional vibrations between disk plates 7, 8 and boss member 5 can be absorbed and damped while transmitting the motive power of the internal combustion engine from disk plates 7 and 8 to boss member 5.

Figure 10:
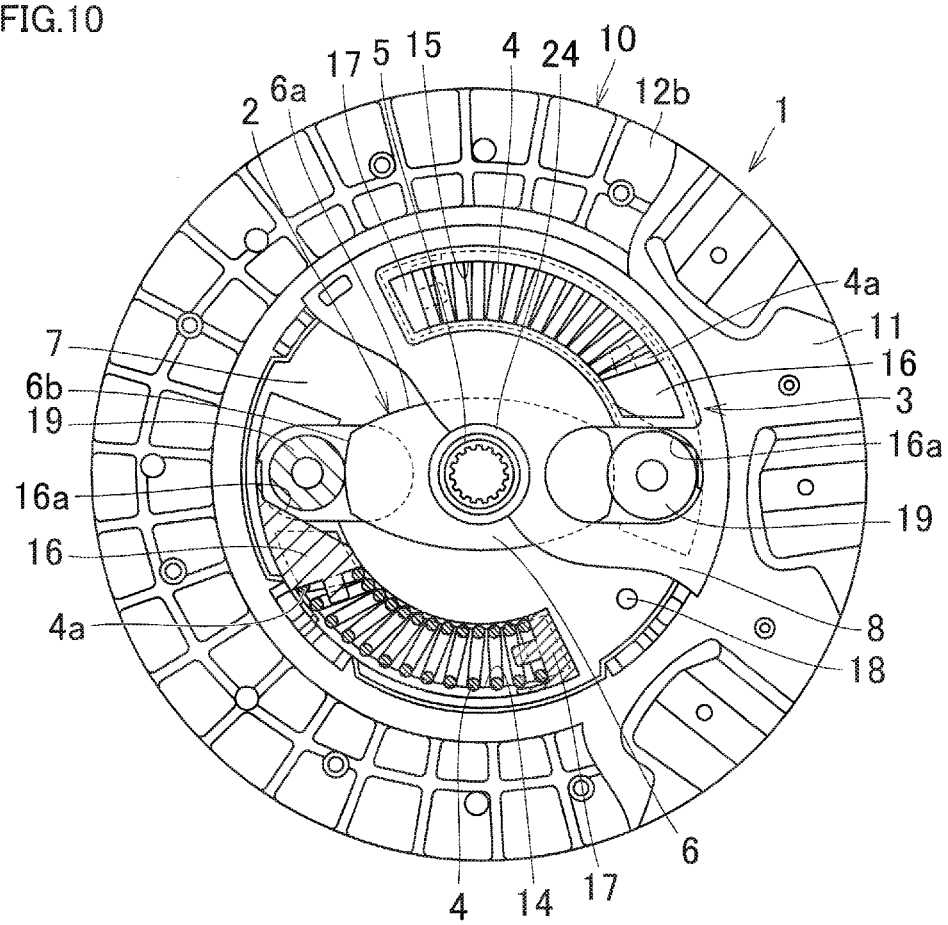
FIG. 10 is a front view of the torsional vibration damper in the case where the torsion angle of the cam member with respect to the disk plate is +90°.

FIG. 10 is a front view of the torsional vibration damper in the case where the torsion angle of cam member 6 with respect to disk plates 7 and 8 is +90°. Cam member 6 has a top portion 6*b*. Top portion 6*b* is a part of cam surface 6*a* located farthest away from boss member 5 and corresponds to a portion of cam surface 6*a* having the largest diameter. In the present embodiment, when the torsion angle between disk plates 7, 8 and cam member 6 reaches the largest angle of +90°, torque transmission member 19 moves to be located on top portion 6*b* of cam surface 6*a*. In the case where disk plates 7 and 8 receive excessive torque from the internal combustion engine, torque transmission member 19 moves beyond top portion 6*b*, thereby causing disk plates 7 and 8 to idle against cam member 6.

In this way, cam member 6 can be functioned as a torque limiter during acceleration of the vehicle. As a result, when disk plates 7 and 8 each receive excessive torque, excessive torque can be prevented from being transmitted from disk plates 7 and 8 to boss member 5, so that the transmission gear set of the transmission can be protected.

Figure 11:
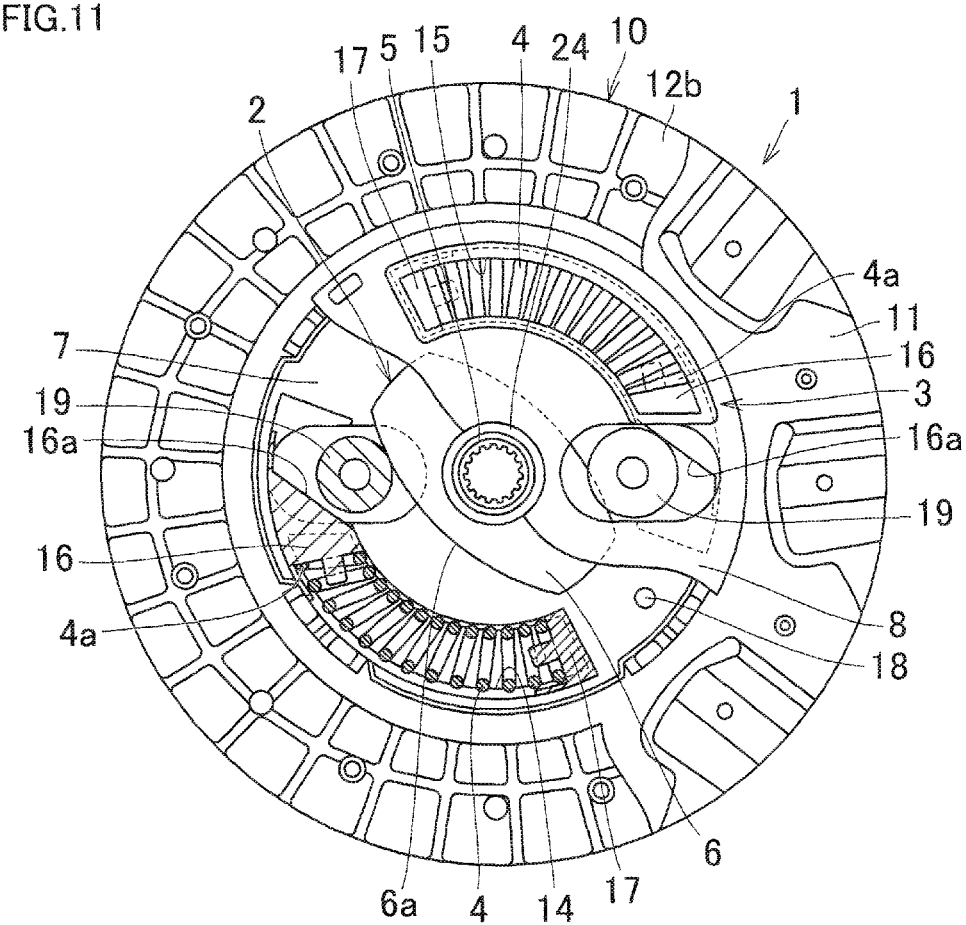
FIG. 11 is a front view of the torsional vibration damper in the case where the torsion angle of the cam member with respect to the disk plate is −45°.

FIG. 11 is a front view of the torsional vibration damper in the case where the torsion angle of cam member 6 with respect to disk plates 7 and 8 is −45°. During deceleration of the vehicle, the driving torque of the internal combustion engine is decreased, and engine braking occurs. Accordingly, the rotation torque is to be input into cam member 6 from input shaft 21 of the transmission. When the rotation fluctuations caused by torque fluctuations in the internal combustion engine are relatively small during deceleration, the fluctuation torque between disk plates 7, 8 and cam member 6 is relatively small. Accordingly, cam member 6 is to undergo torsion in the counterclockwise direction (direction R2) on the negative side with respect to disk plates 7 and 8.

In this case, when disk plates 7, 8 and cam member 6 relatively rotate as in the manner from the state shown in FIG. 1 to the state shown in FIG. 11, cam member 6 rotates in accordance with an increase in torsion angle between disk plates 7, 8 and cam member 6, so that torque transmission member 19 moves along cam surface 6*a*.

Starting from the state where cam member 6 is located at the initial position, the diameter of cam surface 6*a* is increased in accordance with an increase in the torsion angle between disk plates 7, 8 and cam member 6. Accordingly, when torque transmission member 19 is pressed by cam surface 6*a* of cam member 6 that is gradually increased in diameter, torque transmission member 19 moves outward in the radial direction of disk plates 7 and 8.

Also in this case, displacement of torque transmission member 19 in the radial direction is converted through socket member 16 into displacement in the circumferential direction, as in the case of acceleration. In this case, socket member 16 moves toward spring seat 17 along the peripheral edge of each of receiving holes 14 and 15, thereby compressing coil spring 4 in the circumferential direction. Therefore, the torsional vibrations between disk plates 7, 8 and cam member 6 can be absorbed and damped while transmitting the motive power of the drive transmission system from cam member 6 to disk plates 7 and 8.

Since hysteresis torque generation mechanism 22 is interposed between disk plates 7, 8 and cam member 6, constant hysteresis torque can be generated between disk plates 7, 8 and cam member 6, even when cam member 6 undergoes torsion to any of the acceleration side and the deceleration side with respect to each of disk plates 7 and 8.

Figure 12:
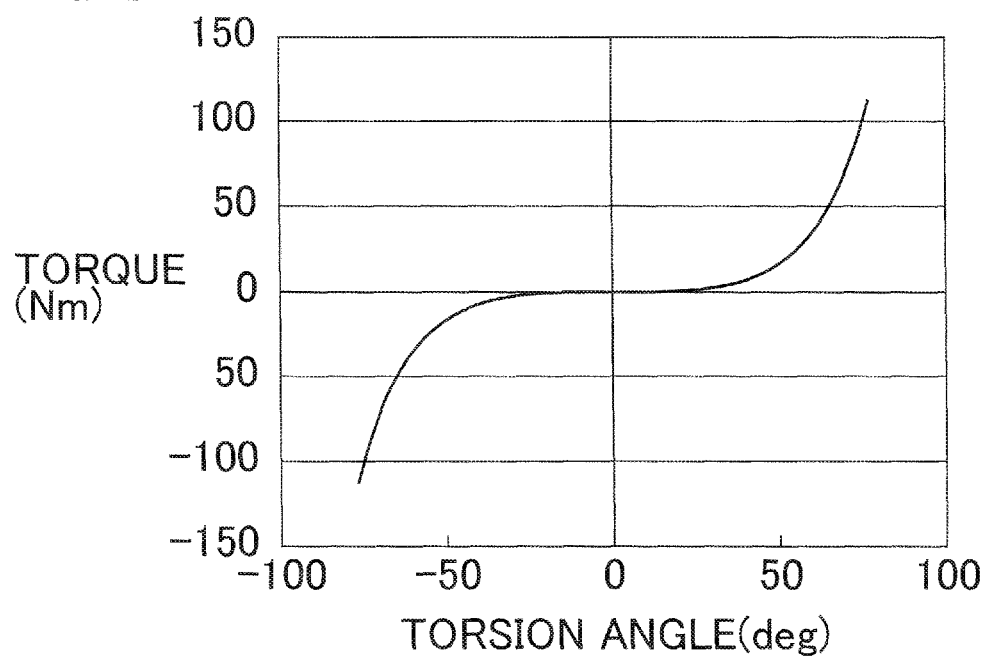
FIG. 12 is a graph showing the relation between the torsion angle and the torque of the torsional vibration damper.

FIG. 12 is a graph showing the relation between the torsion angle and the torque of torsional vibration damper 1. FIG. 12 shows characteristics of torsion between disk plates 7, 8 and cam member 6, and also shows the relation between the torsion angle of cam member 6 with respect to disk plates 7, 8 and the output torque output from cam member 6 in the present embodiment. In FIG. 12, the horizontal axis denotes a relative torsion angle of cam member 6 with respect to disk plates 7 and 8 while the vertical axis denotes output torque output from cam member 6, that is, torsional rigidity. The output torque of the vertical axis corresponds to reaction force (spring rigidity) of cam member 6 to disk plates 7 and 8.

As shown in FIG. 12, in the present embodiment, when coil spring 4 compresses in accordance with an increase in the torsion angle of cam member 6 with respect to disk plates 7 and 8, the pressing force of torque transmission member 19 exerted on cam member 6 is increased. Then, the pressing force of torque transmission member 19 exerted on cam member 6 is increased, thereby increasing the output torque. The change in the output torque at this time leads to curve-shaped torsional characteristics that continuously change.

In the present embodiment, the outer peripheral surface of torque transmission member 19 comes in contact with cam surface 6*a* of cam member 6, and cam member 6 presses coil spring 4 through torque transmission member 19 in accordance with rotation of cam member 6, thereby changing the reaction force from coil spring 4 exerted on torque transmission member 19. Accordingly, as show in FIG. 12, the torsion angle between disk plates 7, 8 and cam member 6 that is caused by rotation of cam member 6 can be widened. In addition, the characteristics of torsion between disk plates 7, 8 and cam member 6 can be rendered nonlinear, and the rotation torque can be smoothly transmitted from disk plates 7 and 8 to boss member 5.

In addition, the torsional characteristics and the magnitude of the torsion angle during relative rotation of disk plates 7, 8 and cam member 6 can be arbitrarily set by adjusting the shape of cam surface 6*a* of cam member 6, the spring constant of coil spring 4, the shape of torque transmission member 19, and the like.

As can be apparent from FIG. 12, in the case where torsional vibration damper 1 is interposed between the driving source and the transmission having a transmission gear set in the vehicle, when the torsion angle between disk plates 7, 8 and cam member 6 is relatively small, the torsional rigidity of disk plates 7, 8 and cam member 6 can be set to exhibit relatively lower torsional characteristics. Accordingly, in the region where the rotation torque transmitted from disk plates 7 and 8 to boss member 5, that is, the output torque of cam member 6, is relatively small as in the case where gears are shifted to neutral in the idle state, it becomes possible to damp the torsional vibration resulting from rotation fluctuations caused by torque fluctuations in the internal combustion engine serving as a driving source, thereby suppressing occurrence of "gara sounds" from the gear pair of the transmission in the unloaded state.

Furthermore, the range of the torsion angle between disk plates 7, 8 and cam member 6 can be widened to allow the torsional rigidity to be entirely lowered. Accordingly, during the low-speed acceleration or deceleration in which the rotation torque transmitted from disk plates 7 and 8 to boss member 5 is relatively large, it becomes possible to damp the torsional vibration resulting from rotation fluctuations caused by torque fluctuations in the internal combustion engine, thereby suppressing occurrence of "jara" sounds caused by collision of the idling gear pair of the transmission gear set.

Furthermore, coil spring 4 can be lowered in rigidity. Accordingly, when the torsion angle between disk plates 7, 8 and cam member 6 is relatively large, it becomes possible to damp the torsional vibration caused by the torsional resonance of the drive transmission system, thereby suppressing occurrence of muffled sounds within a vehicle cabin.

As described above, torsional vibration damper 1 of the present embodiment includes torque transmission member 19 entirely reciprocating in the radial direction of disk plates 7 and 8, and is configured such that a part of the outer peripheral surface of this torque transmission member 19 comes in contact with cam surface 6*a* of cam member 6 and that another part of the outer peripheral surface of torque transmission member 19 comes in contact with tapered surface 16*a* of socket member 16. Accordingly, coil spring 4 and cam member 6 can be coupled to each other via socket member 16 and torque transmission member 19. In a simple configuration in which coil spring 4, socket member 16, torque transmission member 19, and cam member 6 are merely provided between each of disk plates 7 and 8 and boss member 5, it becomes possible to provide torsional vibration damper 1 allowing widening of the range of the torsion angle between each of disk plates 7 and 8 and boss member 5.

Since the rotation torque is transmitted between each of disk plates 7 and 8 and boss member 5 through torque transmission member 19 moving in the radial direction of each of disk plates 7 and 8, there is no need to provide a conventional arm member extending in the circumferential direction for transmitting rotation torque. Accordingly, the length of coil spring 4 extending in the circumferential direction can be increased. Therefore, torsional vibration damper 1 improved in torsional rigidity can be provided without having to increase the size of coil spring 4 in the radial direction to increase the size of torsional vibration damper 1. Since the elastically deforming amount of coil spring 4 in the circumferential direction can be increased, fluctuations in the rotation torque can be absorbed more efficiently.

Since a pair of torque transmission members 19 are arranged so as to be point-symmetric with respect to the center axis of disk plates 7 and 8, these torque transmission members 19 are to sandwich cam member 6 across the center axis of disk plates 7 and 8. Accordingly, when cam member 6 biases coil spring 4 via torque transmission member 19, torque transmission members 19 can sandwich cam member 6 with strong pressing force across the center axis of disk plates 7 and 8 by means of the reaction force of coil spring 4. Accordingly, the rotation torque can be more reliably transmitted from disk plates 7 and 8 to boss member 5, and disk plates 7, 8 and boss member 5 can be integrally rotated with reliability.

Furthermore, according to torsional vibration damper 1 of the present embodiment, socket member 16 holding one end of coil spring 4 in the circumferential direction has tapered surface 16a coming in contact with the outer peripheral surface of torque transmission member 19, and this tapered surface 16a is provided so as to be inclined with respect to the radial direction corresponding to the direction in which torque transmission member 19 moves. Accordingly, displacement of torque transmission member 19 in the radial direction is converted by socket member 16 into displacement in the circumferential direction. When socket member 16 moves in the circumferential direction, coil spring 4 can be elastically deformed greatly in the circumferential direction. Therefore, the reaction force from coil spring 4 exerted on torque transmission member 19 can be increased, thereby allowing improvement in the performance of transmitting the rotation torque from disk plates 7 and 8 to boss member 5.

Receiving holes 14 and 15, which extend in the circumferential direction, each receive socket member 16 and coil spring 4. Accordingly, displacement of torque transmission member 19 in the radial direction can be more reliably converted into displacement of socket member 16 in the circumferential direction, so that coil spring 4 can be elastically deformed with more reliability. In the normal state, coil spring 4 is configured so as to curve along each of receiving holes 14 and 15. Accordingly, when torque transmission member 19 is displaced outward in the radial direction, torque transmission member 19 can greatly bias coil spring 4 in the circumferential direction via socket member 16. Therefore, the reaction force from coil spring 4 exerted on torque transmission member 19 can be efficiently increased.

By interposing hysteresis torque generation mechanism 22 between disk plates 7, 8 and boss member 5, constant hysteresis torque is generated during relative rotation of disk plates 7, 8 and cam member 6. Accordingly, during acceleration or deceleration in which the rotation torque transmitted from disk plates 7 and 8 to boss member 5 is relatively large, hysteresis torque can be generated for large torsional vibrations resulting from the rotation fluctuations caused by torque fluctuations in the internal combustion engine. Therefore, it becomes possible to further damp the torsional vibration caused by torsional resonance of the drive transmission system, so that occurrence of muffled sounds in a vehicle cabin can be further suppressed, and also, occurrence of "jara" sounds can be further suppressed. In addition, when slide-pin shaped torque transmission member 19 shown in FIG. 7 is applied, the hysteresis torque generation mechanism can be omitted, so that the configuration of torsional vibration damper 1 can be further simplified.

According to the above-described embodiments, two torque transmission members 19 are provided, and torque transmission is performed at two positions in cam member 6 by this one pair of torque transmission members 19, but any number of torque transmission members may be provided. For example, the number of torque transmission members 19 may be one, or cam member 6 may be configured in a trifurcated shape to perform torque transmission at three positions by means of three torque transmission members.

In the present embodiment, the driving-side rotation member includes clutch disc 10 and disk plates 7, 8 while the driven-side rotation member includes boss member 5, but the configuration is not limited thereto. In other words, the driving-side rotation member may include boss member 5 as the first rotation member while the driven-side rotation member may include disk plates 7 and 8 each as the second rotation member.

Furthermore, in the present embodiment, torsional vibration damper 1 is interposed between the internal combustion engine and the drive system having a transmission in the vehicle, but the configuration is not limited thereto. The torsional vibration damper can be applied to any configuration as long as it includes a driving source transmitting rotation torque to a driving-side rotation member and a drive system to which the rotation torque output from a driven-side rotation member is transmitted.

For example, torsional vibration damper 1 of the present embodiment may be applied to a hybrid damper and the like in a hybrid vehicle that is interposed between the output shaft of the internal combustion engine and the power split device dividing motive power into the electric motor and the wheel-side output shaft. Furthermore, torsional vibration damper 1 of the present embodiment may be applied to a lock-up damper or the like that is interposed between a transmission gear set and a lock-up clutch device of a torque converter. Furthermore, torsional vibration damper 1 of the present embodiment may be applied between a differential case and a ring gear provided in the outer periphery of the differential case.

Although the embodiments of the present invention have been described as above, it should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

INDUSTRIAL APPLICABILITY

The torsional vibration damper according to the present invention has an effect of allowing an increase in torsional rigidity without increasing the size of the elastic member in the radial direction. This torsional vibration damper is useful as a torsional vibration damper and the like including the first rotation member and the second rotation member that are coupled in a relatively rotatable manner through a torque transmission member and an elastic member, such that rotation torque is transmitted between the first rotation member and the second rotation member.

REFERENCE SIGNS LIST 1 torsional vibration damper, 2 driven-side rotation member, 3 driving-side rotation member, 4 coil spring, 4a one end, 5 boss member, 6 cam member, 6a cam surface, 6b top portion, 7, 8 disk plate, 14, 15 receiving hole, 16 socket member, 16a tapered surface, 19 torque transmission member, 20 fitting hole, 190 shaft portion, 191, 192, 192a, 192b, 193, 193a bearing, 196 main body, 198 covering portion.

The invention claimed is:

1. A torsional vibration damper comprising:
   a boss;
   a pair of disk plates provided coaxially with the boss;
   an elastic member provided between the boss and the pair of disk plates, the elastic member being elastically deformable in a rotation direction of the boss;
   a cam member provided coaxially with the boss, the cam member rotating integrally with the boss, the cam member having a cam surface that changes in diameter in the rotation direction;
   a torque transmission member contacting the cam surface and transmitting rotation torque between the boss and the pair of disk plates, the torque transmission member elastically compressing the elastic member in the rotation direction of the boss when the torque transmission member moves outwardly in a radial direction of the boss in accordance with rotation of the cam member;
   a fitting hole being provided in the pair of disk plates, the fitting hole guiding an entirety of the torque transmission member in the radial direction of the boss; and
   a socket member provided between the torque transmission member and the elastic member, the socket member having a protrusion engaging an end of the elastic member on a side of the torque transmission member, the socket member having a contact surface contacting the torque transmission member.

2. The torsional vibration damper according to claim 1, wherein the contact surface is inclined with respect to the radial direction.

3. The torsional vibration damper according to claim 1, further comprising a seat having a protrusion engaging another end of the elastic member located on a side opposite from the torque transmission member, wherein
   the socket member moves closer to the seat in the rotation direction as the torque transmission member moves outward in the radial direction.

4. The torsional vibration damper according to claim 1, wherein the torque transmission member has an approximately cylindrical outer shape.

5. The torsional vibration damper according to claim 4, wherein:
   the torque transmission member includes: (i) a shaft, (ii) a first rotating body that rotates with respect to the shaft, the first rotating body contacting the cam surface, and (iii) a second rotating body that rotates with respect to the shaft, the second rotating body contacting the contact surface; and
   the first rotating body is smaller in outer diameter than the second rotating body.

6. The torsional vibration damper according to claim 4, wherein:
   the torque transmission member includes: (i) a main body having a cylindrical outer peripheral surface, and (ii) a cover covering the outer peripheral surface; and
   the cover is formed of a material having a smaller coefficient of friction than a material of the main body.

* * * * *